(12) United States Patent
Beresford-Wood et al.

(10) Patent No.: US 11,188,875 B2
(45) Date of Patent: Nov. 30, 2021

(54) COLLABORATIVE DUE DILIGENCE REVIEW SYSTEM

(71) Applicant: Nasdaq, Inc., New York, NY (US)

(72) Inventors: Bret Beresford-Wood, Lafayette, CA (US); Amanda Grosse, New York, NY (US)

(73) Assignee: NASDAQ, INC., New York, NY (US)

( * ) Notice: Subject to any disclaimer, the term of this patent is extended or adjusted under 35 U.S.C. 154(b) by 358 days.

(21) Appl. No.: 15/606,657

(22) Filed: May 26, 2017

(65) Prior Publication Data

US 2017/0262808 A1 Sep. 14, 2017

Related U.S. Application Data

(63) Continuation of application No. 13/543,564, filed on Jul. 6, 2012, now abandoned.

(51) Int. Cl.
*G06Q 10/10* (2012.01)
*G06Q 10/06* (2012.01)
(Continued)

(52) U.S. Cl.
CPC ......... *G06Q 10/103* (2013.01); *G06F 16/168* (2019.01); *G06Q 10/06* (2013.01);
(Continued)

(58) Field of Classification Search
CPC combination set(s) only.
See application file for complete search history.

(56) References Cited

U.S. PATENT DOCUMENTS 5,694,561 A * 12/1997 Malamud ............. G06F 3/0481
715/805
8,176,004 B2 * 5/2012 Malaney ................ G06Q 10/00
707/608
(Continued)

FOREIGN PATENT DOCUMENTS

CA 2773159 A1 * 2/2011 ............. G06F 16/93

OTHER PUBLICATIONS

C. Savulescu, Z. Polkowski and N. Dutta, "Collaborative data management for business: A review of collaborative techniques," 2016 8th International Conference on Electronics, Computers and Artificial Intelligence (ECAI), 2016, pp. 1-4, doi: 10.1109/ECAI.2016.7861144. (Year: 2016).*

(Continued)

*Primary Examiner* — Crystol Stewart
(74) *Attorney, Agent, or Firm* — Nixon & Vanderhye P.C.

(57) ABSTRACT

A system for providing a virtual data room for conducting due diligence on a plurality of documents that are remotely located and accessible over a computer network by a plurality of users using client computer systems. Documents are retrieved from the remote system and presented to a user on their local computing system for review and conducting due diligence tasks thereon. Based on the interaction the user has with the displayed document, due diligence status values that are associated with the display document are updated and stored with the virtual data room system. A display request is received and based on the request a display characteristic is calculated for a folder that includes a set of documents. The display characteristic is determined based on the due diligence status values of all of the documents within the folder.

20 Claims, 10 Drawing Sheets

(51) Int. Cl.
  *G06F 16/16*   (2019.01)
  *G06F 40/14*   (2020.01)
(52) U.S. Cl.
  CPC ...... *G06Q 10/063114* (2013.01); *G06F 40/14* (2020.01); *Y10S 707/99931* (2013.01)

(56) References Cited

U.S. PATENT DOCUMENTS

| | | | | |
|---|---|---|---|---|
| 8,818,959 | B2* | 8/2014 | McAfee | G06F 40/14 707/667 |
| 9,171,333 | B2 | 10/2015 | Beresford-Wood | |
| 2001/0028364 | A1* | 10/2001 | Fredell | G06Q 10/06 715/751 |
| 2002/0059131 | A1 | 5/2002 | Goodwin et al. | |
| 2002/0143691 | A1* | 10/2002 | Ramaley | G06Q 10/10 705/37 |
| 2003/0187932 | A1* | 10/2003 | Kennedy | G06Q 10/10 709/205 |
| 2004/0201622 | A1* | 10/2004 | Rhodes | G06Q 10/10 715/751 |
| 2006/0184540 | A1* | 8/2006 | Kung | G06F 16/958 |
| 2007/0168374 | A1* | 7/2007 | Bourne | G06F 16/81 |
| 2008/0141176 | A1* | 6/2008 | Fukuoka | G06F 3/0482 715/853 |
| 2009/0063535 | A1* | 3/2009 | Petri | G06F 16/93 |
| 2009/0116076 | A1* | 5/2009 | Nagano | H04N 1/00408 358/403 |
| 2009/0265195 | A1* | 10/2009 | Reichhart | G06Q 10/06 705/7.15 |
| 2010/0161645 | A1* | 6/2010 | Chatterjee | G06Q 10/10 707/769 |
| 2010/0312725 | A1* | 12/2010 | Privault | G06N 5/043 706/12 |
| 2010/0325584 | A1 | 12/2010 | Mckenzie | |
| 2011/0302237 | A1* | 12/2011 | Knight | G06Q 10/101 709/203 |
| 2013/0013996 | A1* | 1/2013 | Wu | G06F 16/93 715/227 |
| 2014/0012616 | A1* | 1/2014 | Moshenek | G06Q 10/063114 705/7.15 |
| 2014/0033046 | A1* | 1/2014 | Walsh | G06F 40/131 715/730 |
| 2014/0279694 | A1* | 9/2014 | Gauger | G06Q 40/06 705/36 R |
| 2015/0032645 | A1* | 1/2015 | Mckeown | G06Q 50/18 705/311 |
| 2017/0039182 | A1* | 2/2017 | Ridgeway | G06F 21/6218 |
| 2017/0041296 | A1* | 2/2017 | Ford | G06F 16/951 |

OTHER PUBLICATIONS

S. Castellani and F. Pacull, "XFolders: a flexible workflow system based on electronic circulation folders," Proceedings. 13th International Workshop on Database and Expert Systems Applications, 2002, pp. 307-312, doi: 10.1109/DEXA.2002.1045915. (Year: 2002).*
International Search Report Issued in PCT/SE2013/050653 dated Feb. 12, 2014.
Written Opinion in PCT/SE2013/050653 dated Feb. 12, 2014.

* cited by examiner

| Home | Documents | Secure Email | Address Book | | ⓘ 24-Hour Help Desk |
|---|---|---|---|---|---|

Diligence IQ

Show my progress ▼

- ☐ Show Publisher's View
- ☑ Show my progress
- ☐ Show progress of all groups
- ☐ Show progress of HR Team
- ☐ Show progress of IT Team
- ☐ Show progress of Executive Group

- 📁 1.2.1.4 Customer Contracts
  - 📁 1.2.2 Vendors
  - 📁 1.3 Insurance
- 📁 2 Technology*
  - 📁 2.1 Systems Architecture
- 📁 3 Financials
  - 📁 3.1 2011
  - 📁 3.2 2010
  - 📁 3.3 2009
- 📁 4 Tax
  - 📁 4.1 IRS Lawsuit

Special Folders
- ⭐ My Favorites List
- 📋 Assigned Items
- ➕ Newly Added Documents

---

1.2.1.4 Customer Contracts
Folder contains list of customer contracts as well as fillable forms that we send to our contracts Sort By: Index Number ▼    Add New... ▼

1.2.1.4.1 Regular terms for new companies
32 pages, added 3/4/11 by Juliette B.
This is our standard customer contract, which was for a lot of things.

⚠ Please Review
Assigned to you
(*Over for details)

1.2.1.4.2 ACPF Order Form
5 pages, added 3/4/11 by Juliette B.

✓ Reviewed
Opened 3/15 3:30pm

1.2.1.4.3 2010 Customer Receivables*
138 pages, added 3/2/11 by John A.
Grid of our receivables.

Not Reviewed
Unopened

1.2.1.4.8 Cost Calculator
ACTIONS  138 pages, added 3/2/11 by John A.
This should be opened in Excel as it contains various macros that help you understand.

Not Reviewed
Unopened

1.2.1.4.6 Simms Lumber Contract
5 pages, added 3/4/11 by Juliette B.

Not Reviewed
Unopened

1.2.1.4.8 Top Client Contracts 2011
ACTIONS  138 pages, added 3/2/11 by John A.
This should be opened in Excel as it contains various macros that help you understand.

Not Reviewed
Unopened

1.2.1.4.8 Disputed client billings 2010 Q3
138 pages, added 3/2/11 by John A.
This should be opened in Excel as it contains various macros that help you understand.

Not Reviewed
Unopened

Page 1 2 3 more

COLLABORATIVE DUE DILIGENCE REVIEW SYSTEM

CROSS-REFERENCE TO RELATED APPLICATIONS

This application is a continuation of U.S. application Ser. No. 13/543,564, filed Jul. 6, 2012, the entire contents of which are hereby incorporated by reference.

TECHNICAL OVERVIEW

The technology herein relates to collaborative due diligence review of documents that are provided in secure virtual data room systems. More particularly, the technology herein relates to providing users with visual indications of the status of a given due diligence project that is associated with documents stored in the virtual data room.

INTRODUCTION

Due diligence is an important part to a business transaction and includes review, research, analysis, and other inquiries into matters related to that transaction. An example is a merger between two companies. Mergers are typically complex transactions that require numerous individuals performing multiple, different tasks to carry out due diligence on the merger. With so many users and documents it can be difficult for stakeholders or other managers to obtain information on how the due diligence process is progressing.

In a traditional due diligence setting, all of the documents and other information related to the merger may be collected into one "secure" room. However, the number of documents that need to be reviewed and analyzed usually prevents all persons involved from being in the room at the same time. For example, there may be 20,000 documents related to the merger. Given this number, it may only be possible to allow a subset of people into the room to conduct their respective due diligence tasks.

Virtual data rooms (VDR) allow companies and individuals to conduct due diligence in a virtual environment. VDRs can be an attractive alternative because of cost-savings and other advantages (e.g., allowing multiple people to view a document simultaneously). However, the inventors of the instant application recognized that there are still short comings to carrying out due diligence using traditional techniques.

One problem is that documents are typically provided in one room (whether that room is virtual or physical) and then teams of people are allowed access to those documents. However, the size of the due diligence projects (the number of documents, the number of reviewers, or both) makes it difficult or inefficient for managing stakeholders (e.g., a CEO or other manager) to determine how the overall due diligence process is progressing. For example, one team responsible for conducting due diligence on the information technology (IT) portion of a merger (and the documents associated therewith) may be behind in their due diligence process. This may adversely affect when a merger may be completed or closed. Thus, knowledge that the team performing IT related due diligence (e.g., reviewing source code, asset lists of computer hardware, etc) is behind schedule may be of use to a person in charge of the due diligence. However, manually keeping track of the due diligence progress of teams of users can be difficult and unreliable.

The information related to the progress of users conducting due diligence may be used determine how resources should be allocated to a given due diligence project. For example, the review of IT documents may be behind schedule (e.g., 50% done), while the review of past sales numbers from the sales department is ahead of schedule (e.g., 95% done). In certain instances, the knowledge related to such figures may be important to successfully carrying out due diligence projects. Accordingly, more comprehensive and reliable technology for carrying out or facilitating due diligence in an electronic environment is still needed.

Related due diligence technology is described in commonly assigned, U.S. patent application entitled "DUE DILIGENCE SYSTEMS AND METHODS,", the entire contents of which are hereby incorporated by reference.

SUMMARY

In certain example embodiments, a secure workspace system for conducting due diligence is provided in which users safely upload sensitive documentation onto a hosted, web-based application provided on a server. The secure workspace system allows users to access documents in a secure manner anywhere in the world via a network connection (e.g., over the internet). Law firms, investment banks, corporations, and others may use this technology to increase productivity and improve document repository solutions when conducting due diligence.

Certain example embodiments provide visual indications through a graphical user interface of a computer system on a measure of the completeness of a task associated with the performance of due diligence. For example, the user interface may include a heat map, which may be provided in a tree view form. Users can see a tree view of document folders along with a "heat map" overlay of color coding that indicates, for example, which documents and folders are most viewed and least viewed, the status of the current review completeness, etc.

In certain example embodiments, a system provides a visual indication that takes into account multiple sub-folders containing hundreds or thousands of documents. Such visual indications allow users to quickly determine performance of a due diligence project. Such improvements may be particularly useful in high value situations (e.g., mergers) where knowing what is happening at a given moment can help keep a deal from falling apart.

An example workflow for a due diligence system may have the following elements:
1. A user uploads a folder that has many subfolders and many documents within the subfolder.
2. An initial tree view of this folder tree may resemble a typical tree view found in more traditional user interface contexts with the folders having a uniform color (e.g., grey).
3. These folders are published to a user (or the user's group) for review.
4. Based on the open rate of documents within a particular folder, the folder in the tree view will change colors from grey, which indicates that no documents have been reviewed, to light green, which means some documents have been reviewed, to a bright green, which indicates that all documents have been reviewed in that folder.
5. Users may then visually and quickly see their personal review status.
6. Because of the varying shades of color, users can quickly distill key information such as how much remains to be reviewed, where there are assignments or shared notes on documents, and how many documents on a per folder basis require review.

In certain instances, example visual indications allow users to avoid generating laborious reports on review statuses by allowing users to see immediately which folders are most reviewed along with how much remains to be reviewed. Thus, users can save valuable time because a visual indication (e.g., heat map) allows them to quickly see and synthesize important information about the due diligence review.

In certain example embodiments, a system provides a virtual data room for conducting due diligence on a plurality of documents by a plurality of users that are remotely located from the system. The system includes a storage medium and a processing system. The storage medium is configured to 1) store the plurality of documents on which due diligence is to be conducted by the plurality of users; and 2) store at least one due diligence status value for each one of the plurality of documents. The processing system includes at least one processor and is configured to associate each one of the plurality of documents, indirectly or directly, with at least one folder out of a plurality of folders, a first set of documents of the plurality of documents being associated with a first folder out of the plurality of folders. The processing system provides a requested document out of the first set of documents to a user in the plurality of users and updates at least one due diligence status value that is associated with the document based on usage of the document by the user. The processing system receives a display request to view a visual representation (e.g., such as an icon) of the first folder from a perspective of the user and determines a displayable characteristic of the first folder based on the at least one due diligence status value associated with each one of the documents in the first set of documents. Responsive to the display request, data is output to form the visual representation of the icon of at least the first folder, where the visual representation is based on the determined displayable characteristic of the first folder.

In certain example embodiments, a method of providing information to a group of users conducting due diligence through a virtual data room system is provided. The virtual data room system includes at least one processor and a plurality of files is stored on a storage medium system of the virtual data room system. A plurality of folders is managed where each one of the plurality of managed folders associated, directly or indirectly, with at least one of the plurality of stored files. The plurality of folders includes a first folder that is associated with a first group of stored files out of the plurality of stored files. At least one due diligence status value for each one of the plurality of stored files is stored on the storage medium system. User interaction with a stored file in the first group of stored files is tracked. The at least one due diligence status value that is associated with the stored file based on the tracked user interaction with the stored file is updated. A display characteristic associated with the first folder based on each one of the due diligence status values associated with the first group of stored files in the first folder is calculated via the at least one processor. Data is output that represents a visual indication of an icon of the first folder that is to be displayed on a display device to a user, the visual indication of the icon based on the calculated display characteristic.

In certain example embodiments, a non-transitory computer readable storage medium stores instructions for use with a virtual data room system for performing due diligence on securely stored information that is remotely accessible to a plurality of users. The securely stored information is segregated into a plurality of different portions where each one of the different portions is respectively associated with at least one due diligence status value. Each one of the plurality of different portions of the stored information is associated with at least one virtual container out of a plurality of virtual containers. Each one of the virtual containers is associated with an identifier with a first portion of the stored information being associated with a first virtual container out of the plurality of virtual containers. A request is received from a remote computing device to retrieve the first portion of the stored information. The first portion of the stored information is sent to the remote computing terminal responsive to the received request. The at least one status value of the first portion is updated based on a determined interaction with the first portion. A display request is received to view a visual representation of at least the first virtual container and a display characteristic of the first virtual container is determined based on the at least one status value associated with each one of the plurality of different portions that are associated with the virtual container. Responsive to the display request, data is output for forming the visual representation of at least the first virtual container where the visual representation is based on the determined display characteristic.

In an aspect, the at least one due diligence status value includes a reviewed status value that indicates whether the respective document has been reviewed or not reviewed by at least one user in from the plurality of users.

In another aspect, the reviewed status value of the document is updated to indicate that the document has been reviewed when the user has the document open for more than a predetermined period of time.

In yet another aspect, the at least one due diligence status value includes an assignment due diligence task value that indicates whether the respective document is associated with a due diligence task that is assigned to at least one user of the plurality of users.

In certain example embodiments, different visual representations are associated with The features described herein may be combined to form additional embodiments and sub-elements of certain embodiments may form yet further embodiments.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

A virtual data room provides functionality to users to allow them to quickly determine information regarding a due diligence project. Such functionality and processes allow for quicker problem recognition and subsequent re-tasking of resources, if appropriate, to address identified problems associated with the due diligence process.

Figure 1:
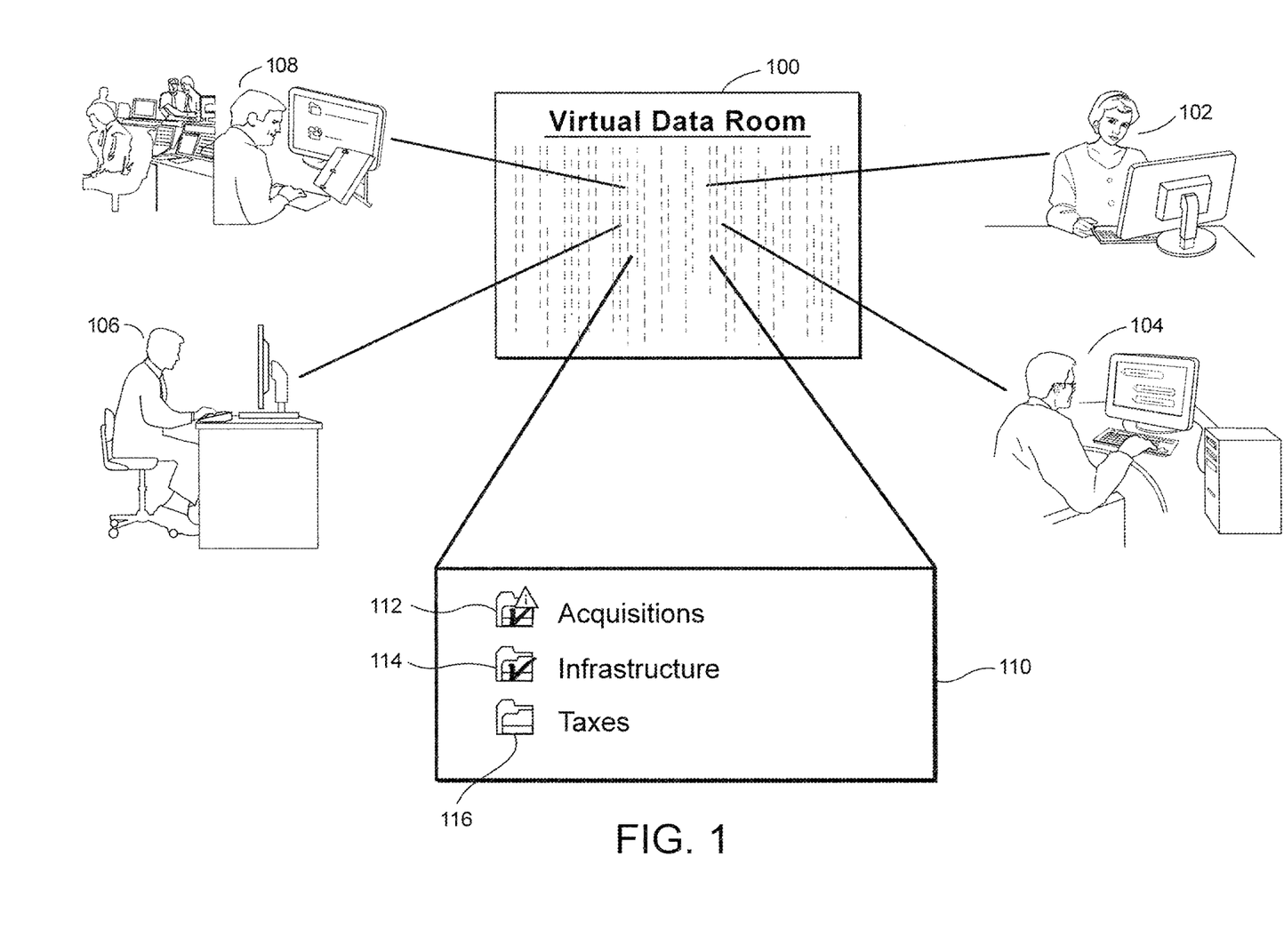
FIG. 1 depicts an example virtual data room computing system with users remotely accessing the virtual data room.
Figure 9:
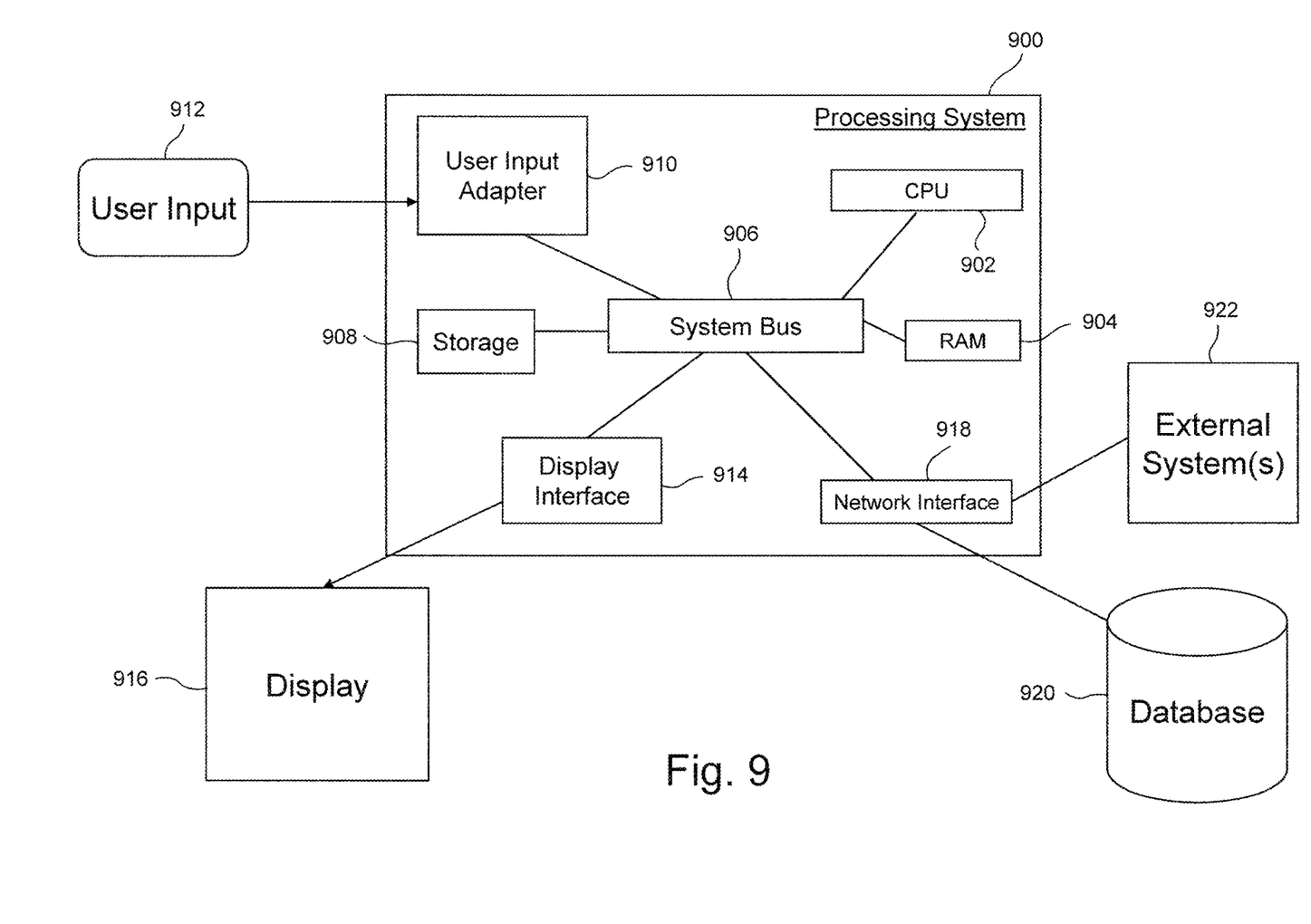
FIG. 9 is a block diagram of an exemplary computing system according to certain example embodiments.

FIG. 1 depicts an example virtual data room computing system with users remotely accessing the virtual data room. The virtual data room 100 is provided on a computer system (e.g., as shown in FIG. 9) and allows users 102, 104, 106, and/or 108 to connect with and use services provided by the virtual data room system 100. The virtual data room 100 stores hundreds or thousands of different documents that may be part of a given due diligence project, such as a merger transaction.

The term "document" encompasses files and information beyond that of a traditional document (e.g., such as a word processing document). For example, the term document also includes video or audio files, databases, images, or other such information that may be part of a due diligence process. The stored documents may be further broken down into various groups and groups of groups (e.g., a group may have several sub-groups, each of which contains various related documents). In the virtual data room system 100, the groupings are represented as folders 110 that store documents related to a particular topic. For example, documents related to acquisitions are found in the "Acquisitions" folder 112, documents related to infrastructure concerns are found in the "Infrastructure" 114 folder, and documents related to tax matters are found in the "Taxes" 116 folder.

Figure 2:
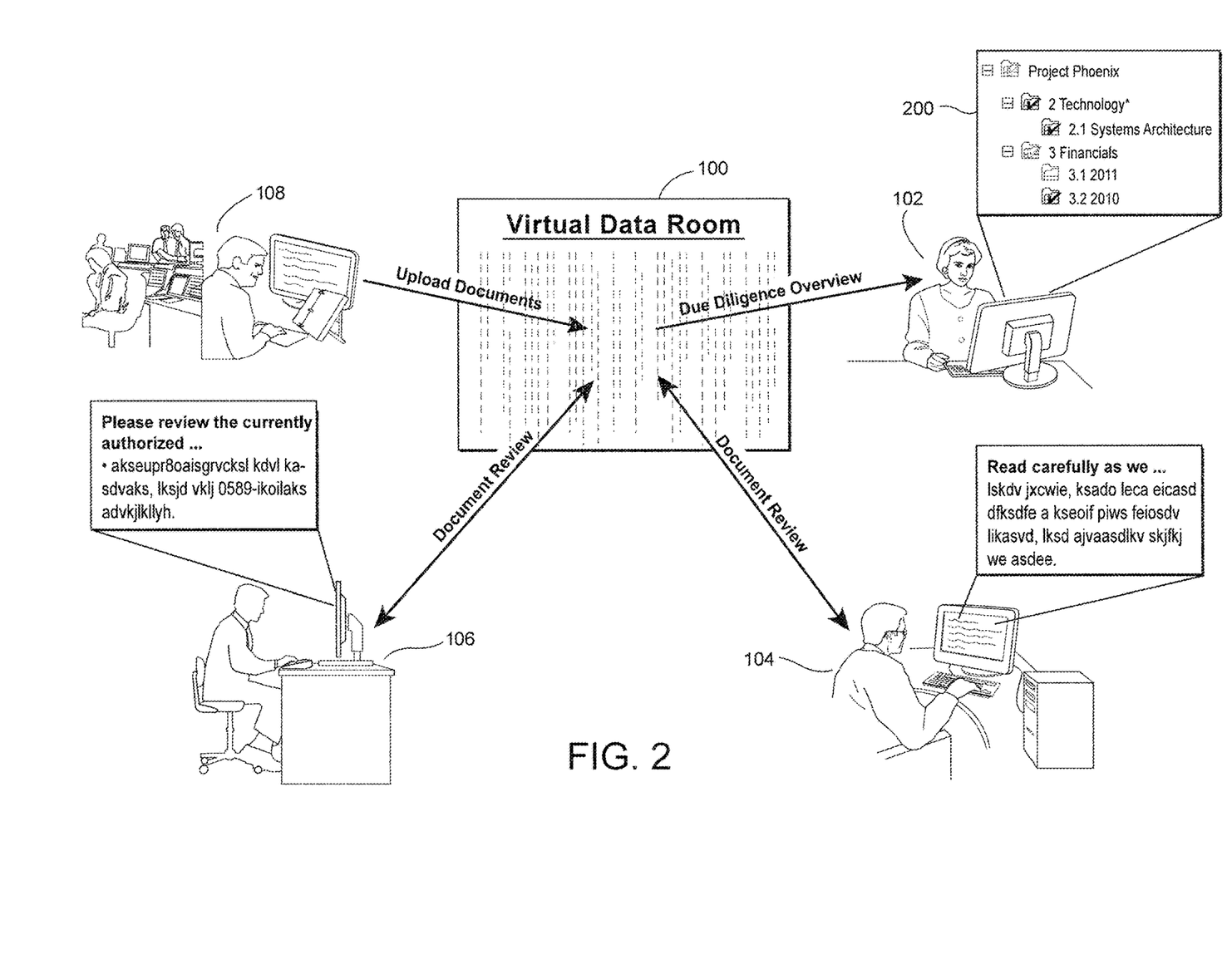
FIG. 2 shows a further refinement of FIG. 1 and depicts users performing specific due diligence tasks in the virtual data room.

FIG. 2 shows a further refinement of FIG. 1 and depicts users performing specific due diligence tasks in the virtual data room. Here, user 108 first uploads documents to the virtual data room. Such uploaded documents may be stored in a storage system such as network attached storage or a database. The user 108 may associate the uploaded documents with one or more folders or other groups. For example, if user 108 uploads documents related to the information technology (IT) infrastructure of a company that is part of a merger transaction, all of such documents may be placed into or associated with an "IT" folder. Similarly, documents related to product sales, human resources, taxes, and the like may be placed into their respective folders.

Permissions or other access controls may also be set so that only authorized users may view the IT related documents. For example, users that are assigned to review tax records of the company in question may be barred from seeing documents related to the IT infrastructure. Similarly, users assigned to review IT infrastructure documents may not see documents related to the company's tax records. Authorization of this nature can keep potentially important or valuable information viewable by only those individuals or teams that need access to such information.

In certain instances a user being associated with the file or a folder may mean that the user can either: 1) see the file/folder; or 2) have access to the file/folder (e.g., are eligible to open the file and/or update a due diligence status of the file).

In certain instances, managers or other high level users may be able to see one or more folders or groupings that are not available to other users. For example, the IT team and the tax team may share a manager. Thus, the manager may have permissions to see the folders of his two-subordinate teams. In other words, certain implementations may provide functionality for user a user to keep better track of the due diligence progress of these subordinate teams.

With the documents related to a due diligence project stored in the virtual data room 100, users may then access the virtual data room via a computer network to perform specific due diligence tasks. In FIG. 1, user 106 is shown reviewing documents that may relate to previous financial statements. User 104 is shown conducting due diligence on different documents that are related to the IT systems of the company for a merger. In the course of reviewing and conducting due diligence tasks the virtual data room system 100 may update the status of the document (or information) that is being review by the respect user.

For example, while reviewing a particular IT related document the system may note that the user has opened the document. Additional statuses or details that may be tracked may include the length of time the document has been open, which pages of the document have been displayed, the length that those documents or pages have been displayed. In certain instances, the quality of a review may be determined by tracking how long a given page is open and reviewed by a user. This value may then be used in determining a gradation of due diligence review of a file. In other words, in certain example embodiments, whether a document is reviewed or not may be a matter of degree rather than a yes/no answer.

In certain example embodiments, one or more of such statuses or variables may be combined to determine whether or not a document has been reviewed or subjected to due diligence. In certain example embodiments, such information may be recorded based on individual users or a team of users (e.g., has anyone opened this document). In certain example embodiments, documents or tasks may require more than user review of the document or information. Thus, the system may record individual user usage and take such usage into account when determining whether or not a document has been "reviewed."

While users 104 and 106 conduct due diligence on the documents in the system, user 102 may keep track and obtain a synthesized view of how due diligence is progressing. Specifically, user 102 may load view 200 to obtain an overview of how due diligence is progressing for the Technology related documents (being reviewed by user 104) and the Financials related documents (being reviewed by user 106).

As described in greater detail below, user 102 (who may be the boss or manager of users 104 and 106) may be presented with an intuitive view that allows quick and efficient determination on how well the due diligence project is progressing. In this case, the darkened checkbox for the Technology folder may indicate that all or most of the due diligence tasks for the Technology documents are completed. In contrast, the faded checkmark over the Financials folder indicate that only some of the related documents have been reviewed.

As shown in FIG. 2, user 102 may be able to quickly and efficiently determine that the 2011 Financials have not been reviewed while the 2010 Financials have been reviewed. By obtaining such information in a quick an efficient graphical manner, user 102 may be able to determine why those particular financials have not been reviewed and, if necessary, take corrective measures to help ensure the due diligence process is completed in a timely and/or efficient manner.

For example, was a particular user tasked with reviewing the 2011 financials and has simply not done so? Is review of the financial reports proving to be more time consuming that anticipated? Information related to this problem may be displayed to user 102 in form of metrics that indicate how long review of a given document is taking. Thus, user 102 may then act to task additional resources (e.g., further users) to assist in the due diligence tasks associated with the Financial documents.

In certain instances, the presentation of such information may allow team leaders or other manages to more efficiently answer relevant questions to the performance of due diligence. For example, "What documents or items has my team been reviewing?" or "What information have they not reviewed?"

In certain instances, bottlenecks in the due diligence process may be identified more quickly and easily with the techniques described herein. For example, certain implementations may allow assignments to be assigned to other virtual data room users. These assignments may be related to carrying out due diligence on the information in question. Such assignments may be described in the context of dynamic due diligence, described in further detail in application "DUE DILIGENCE SYSTEMS AND METHODS", the entire contents of which are hereby incorporated by reference.

An example of a bottleneck may be if there is one expert in a particular area that is being overloaded with assignments or questions that take large amounts of time to address.

Figure 3:
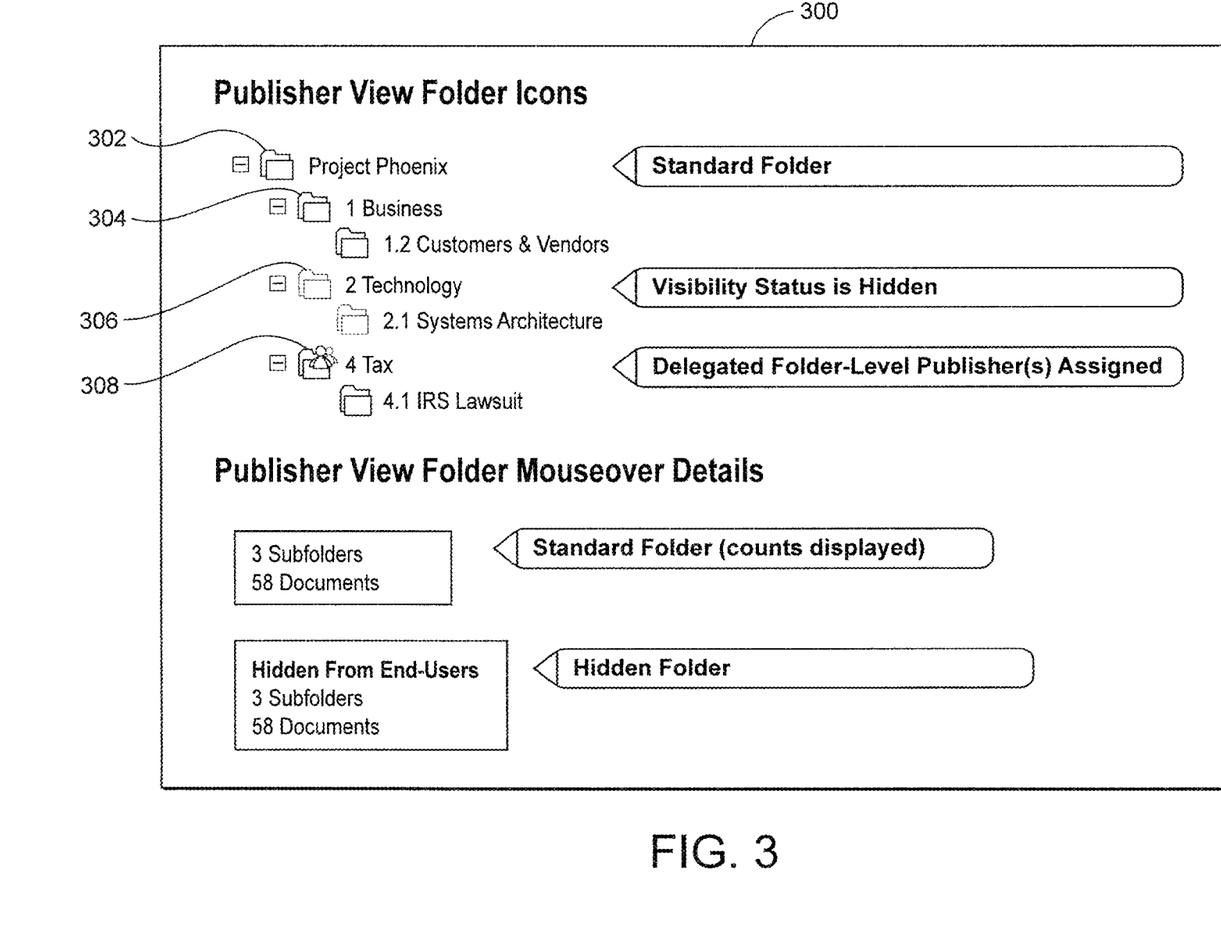
FIG. 3 depicts an example graphical interface and associated user interface implementations for an example virtual data room system.

In presenting visual information to a user regarding the due diligence of a particular project (or subset of a project), different visual queues may be used to inform the user of the status of how due diligence is progressing. FIG. 3 depicts an example graphical interface and associated user interface implementations for an example virtual data room system. The interface shown in FIG. 3 may be that of a publisher that is setting up the folders to be viewed by a user or group of users of the virtual data room system. The graphical tree view in FIG. 3 may be similar (but with some additional features for publishers or administrators) to that shown in element 200 of FIG. 2.

The Project Phoenix folder 302 may be a complete due diligence project that is broken down into multiple components or pieces. This breakdown may be along logical breaks within a given project (although other organizational setups for the documents being reviewed may be implemented). Thus, business folder 304 may be separate from technology folder 306 and tax folder 308. Further, the folders may then have sub-folders that further break down the documents associated with the more general level folders.

In FIG. 3, the administrator assigns different permissions or rights to various groups. Thus, the administrator may leave the permissions at a default level for the "Project Phoenix" folder. This default permission may allow, for example, regular users to view, but not interact with documents (e.g., performing dynamic due diligence tasks on documents associated with those folders is prohibited).

The administrator may also hide other folders from the users so that viewing the contents of a virtual data room may not shown all documents or folders associated with the due diligence project. When a folder is classified as hidden the graphical interface may change the graphical representation of the folder to indicate as such (e.g., making the folder transparent)

Also, the administrator (or publisher) may assign or delegate portions of the due diligence project to the team (which may be one or more users). In FIG. 3 the tax folder is delegated to a particular team.

The team that the folder is assigned to may have a leader who may then assign sub-folders or even individual documents to members of the team. This may allow more flexibility in how teams carry out their due diligence (e.g., because the immediate manager of a team may better know the strengths, weaknesses, capabilities of the respective team members).

In certain example embodiments, placing a cursor (e.g., a mouse pointer) over a folder (or in the vicinity of a folder) may provide the administrator with additional details on the folder. For example, the number of sub-folders and total number of files may be displayed. Further, the "mouse-over" details may also indicate how a user of the system views the virtual data room.

Figure 4:
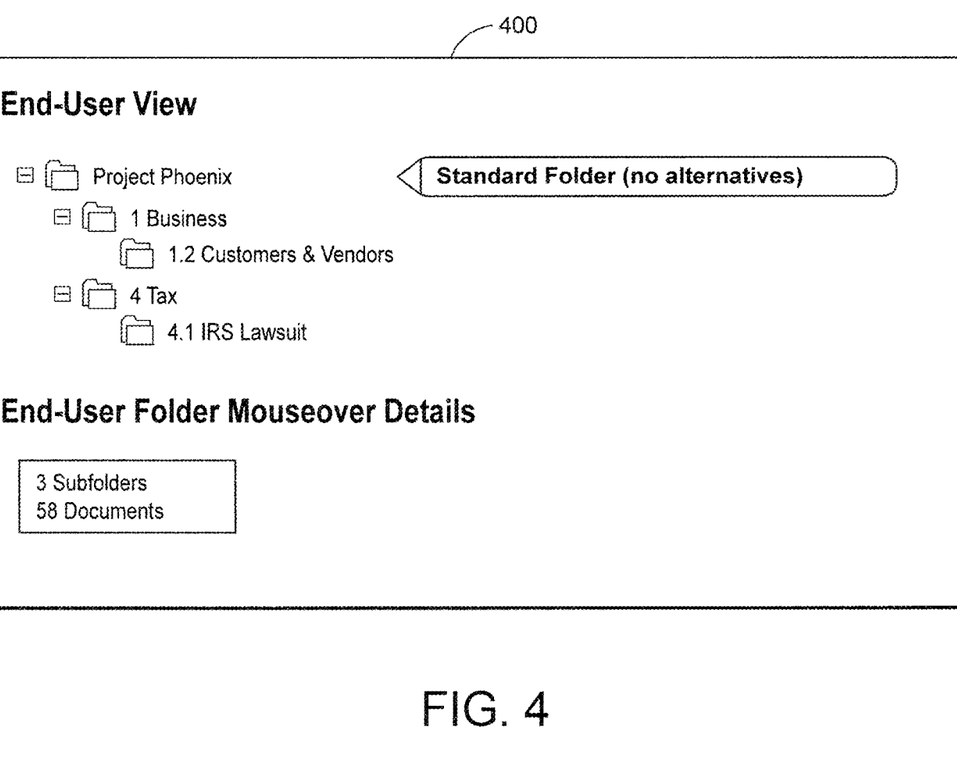
FIG. 4 depicts another example graphical interface and associated user interface implementations for an example virtual data room system.
Figure 5:
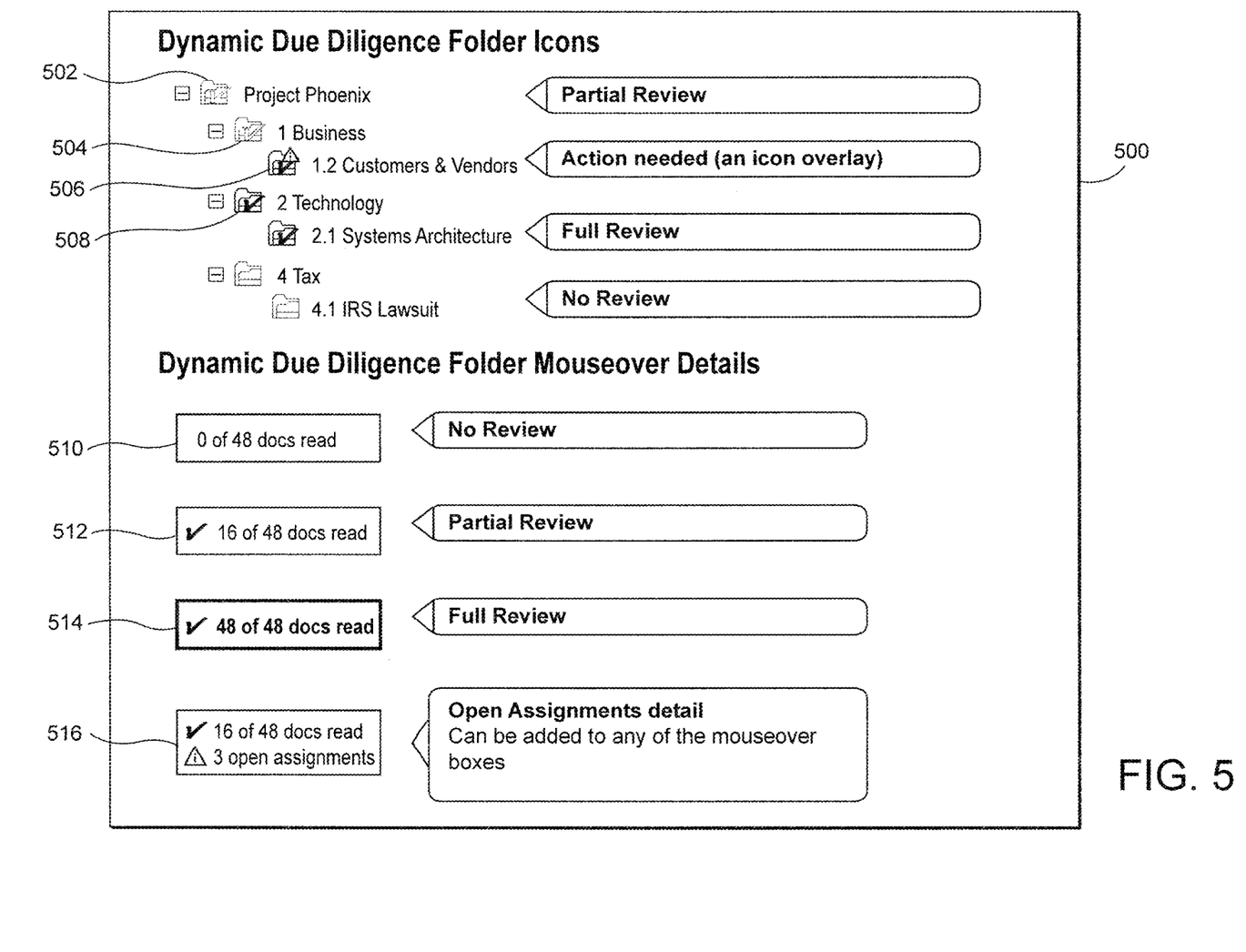
FIG. 5 depicts yet another example graphical interface and associated user interface implementations for an example virtual data room system.

FIG. 4 depicts another example graphical interface and associated user interface implementations for an example virtual data room system. In particular, graphical user interface 400 depicts how an end user may see the contents of a virtual data room system. As can be seen, the interface 400 in FIG. 4 is simpler than the interface 300 shown in FIG. 3. In particular, only those folders that are set to be seen by the end-user are displayed in interface 400. Thus, the "technology" folder that was indicated as hidden by the administrator is not displayed. Furthermore, the mouse over details may change such that only those documents/folders that are visible to the end-user are counted FIG. 5 depicts yet another graphical interface and associated user interface elements for an example virtual data room system. Specifically, interface 500 may be a view that allows a user, such as a manager, to quickly synthesize information on a due diligence project. In particular, a project Phoenix is undergoing due diligence and accordingly a root folder 502 that is labeled "Project Phoenix" contains a business folder 504, a technology folder 508 and a tax folder. Further the business folder 504 includes a customers & vendors folder 506 and the technology folder 508 includes a systems architecture folder. Similarly the tax folder includes an IRS lawsuit subfolder. Each of these folders may include multiple documents (e.g., hundreds or even thousands).

As the user interface view in FIG. 5 is that of a manager or other user with appropriate permissions, the user interface may show additional details that allow for efficient consumption of information concerning the status of a due diligence task. In particular, the customers & vendors folder 506 includes an icon that overlays the folder. In this case, the icon graphically shows a user that all of the documents in the folder have been reviewed (indicated by the solid checkmark), but that there are outstanding assignments (or actions) associated with the documents in the folder. Such actions may indicate that, for example, a dynamic due diligence item is still unresolved and that further action is needed on the part of one or more users.

Other graphical indications may indicate other statuses. A silhouetted checkmark (e.g., associated with the business folder 504) may indicate that some work has been completed, but that there are still additional due diligence related tasks (e.g., reviewing or completion of dynamic due diligence items) that need to be attended to. As explained above solid black check marks may indicate that all of the documents in the folder have been reviewed and that due diligence is "complete" for those documents. No checkmark or just a plain folder icon may indicate that no action on the documents in the folder has been taken (e.g., no documents have been reviewed).

As explained above, the folders may also have associated mouse over actions that provide additional information to a user. Mouse over action 510 may indicate that none of the documents in the folder (or subfolders) have been reviewed (e.g., as with the tax folder). Mouse over action 512 is a partial review status and may appear if a user hovers over the business folder. The mouse over action 512 then displays the total number of documents that have been reviewed out of the total number of documents in the folder. Mouse over action 514 is displayed when all of the documents have been reviewed. Again, the total number of documents in the folder(s) is displayed to the user. Mouse over 516 is displayed when there are open assignments associated with a folder. In certain implementations this mouse over may be combined with the above mouse over's to provide details to a user on how many open assignments there are for a given folder.

In certain example embodiments, the status value associated with a given folder may depend on files that are found directly within that folder and/or may depend on files that are indirectly in the folder. For example, the status value of Business folder 504 (e.g., the check mark) may be determined only by files directly within the business folder. Alternatively, the displayable status value of Business folder 504 may be determined by information directly within the folder 504 and information that is also found in subfolders, such as, for example the Customers & Vendors folder 506. Accordingly, all or some of the documents associated with a given folder may be used to determine a status value or display characteristic of a folder.

Figure 6:
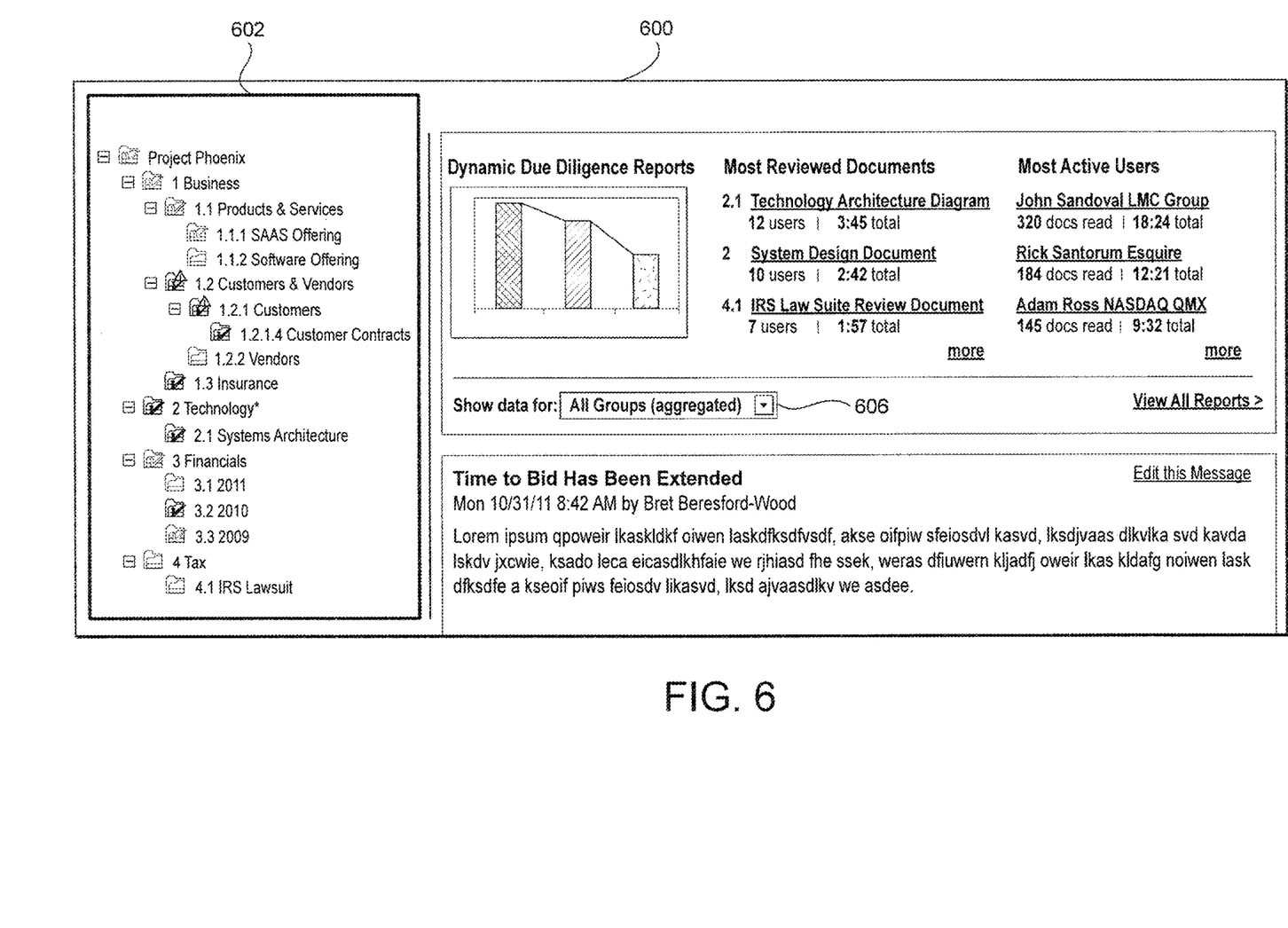
FIG. 6 depicts an example graphical user interface with a tree view and report dashboard of a virtual data room system according to certain example embodiments.

FIG. 6 depicts an example graphical user interface with a tree view and report dashboard of a virtual data room system according to certain example embodiments. Here, user interface 600 includes an interface element 602 that may correspond to at least some of the elements in 500. In addition to the tree view in user interface 602, additional graphical user interface elements may be used to provide users with more information on the progress of a due diligence project. In particular, reports may be run to present information to a viewing user. The reports may allow a user to choose how the data should be compiled. For example, the reports may be compiled for all teams or groups or may be run for only particular groups (e.g., just the group reviewing IT related documents). The reports may also be run for individual user.

Figure 7:
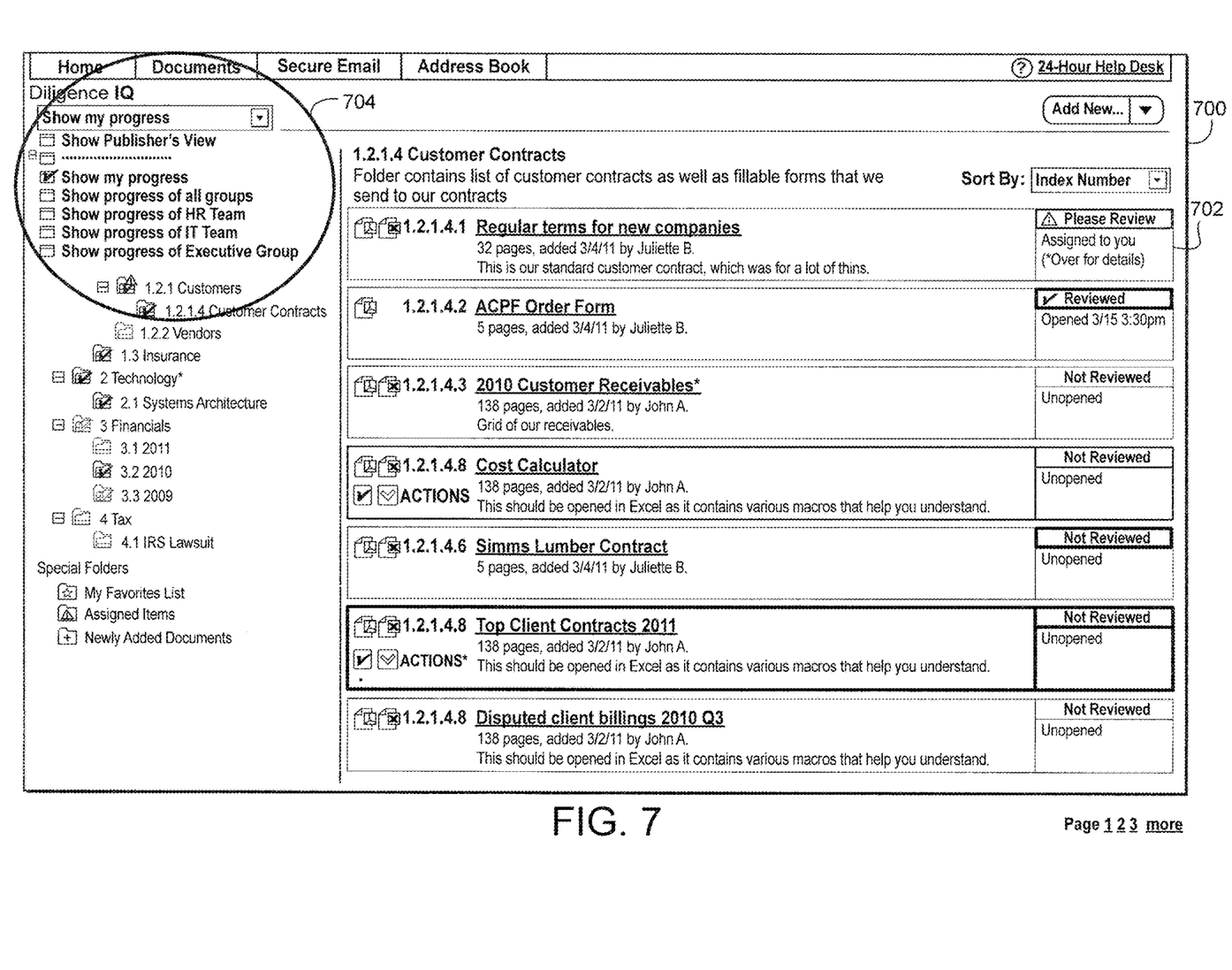
FIG. 7 depicts a team view example graphical user interface for an example virtual data room system.

FIG. 7 depicts a team view example graphical user interface for an example virtual data room system. In this example user interface 700 users can select how the tree view is displayed. As noted above, in certain examples, reports may be created and run to present users with the information shown in FIG. 6. However, similar information may also be integrated into the folder view shown in FIG. 7.

Specifically, users may be shown the progress related to a particular group or person via the user interface control 704. In this case, the user viewing the user interface 700 has selected their own progress, which may show documents and folders assigned to the user and due diligence statuses of those respective documents or folders.

The user can also select a folder and show the individual documents in the folder. In FIG. 7, 1.2.1.4 Customer Contracts is shown to the right of the tree view. The documents and their associated status are shown to the user. From here the user may open and review the documents. Alternatively, with item 702 for example, the user can perform dynamic due diligence operations when a given dynamic due diligence item is assigned to that user.

Thus, the presented folder view and overlaying "heat map" that indicates due diligence progress may avoid a requirement for the generation of laborious reports on individual review statuses. This view may allow users to immediately see which folders are the most reviewed along with how much of the due diligence process remains to be done. Further, the drop down control 704 allows users the option of displaying the status of peers or other groups. Such an implementation can thus provide advantages in terms due diligence transparency over previous solutions.

Figure 8A:
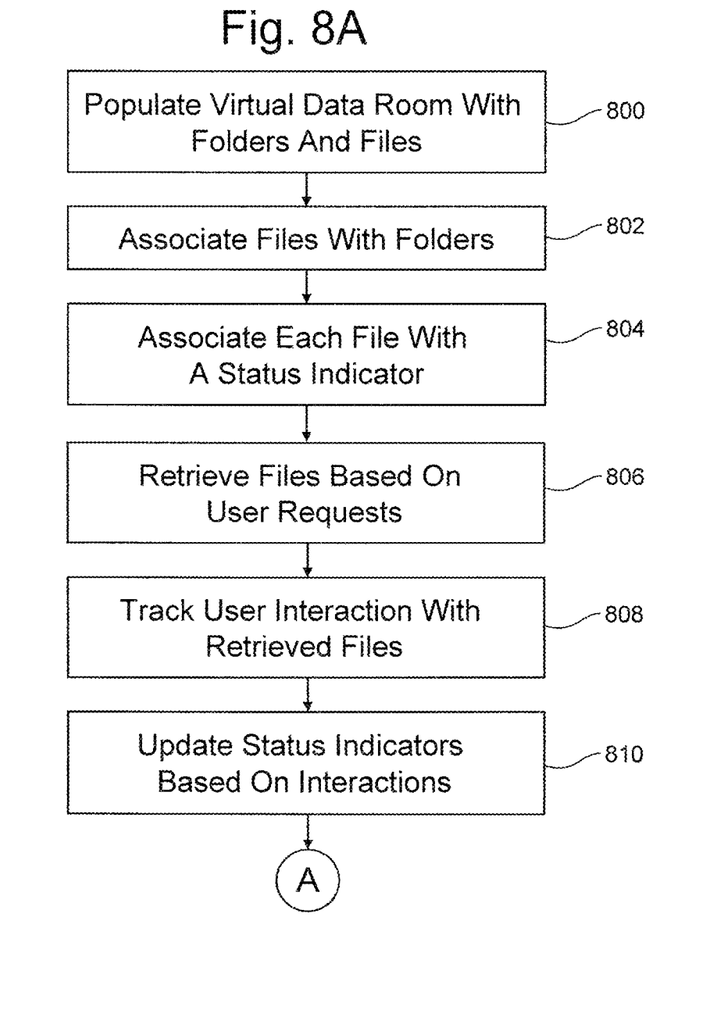
FIGS. 8A and 8B show a flow chart of an example computer process for providing due diligence related information to a user of a virtual data room.
Figure 8B:
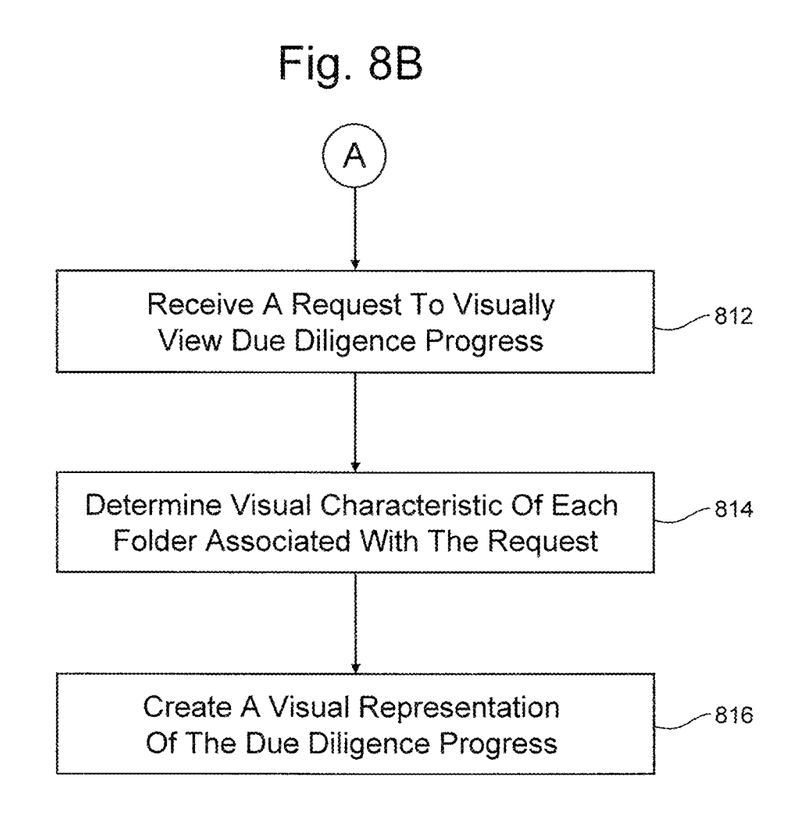

FIGS. 8A and 8B show a flow chart of an example computer process for providing due diligence related information to a user of a virtual data room. In step 800 a virtual data room (e.g., such as virtual data room 100) is populated with folders and files. In certain instances, this may include setting up user permissions and other administrative tasks. The folders may be automatically created and associated with the uploaded files in step 802.

In step 804, the files may have one or more status indicators or values setup. For example, a value that indicates whether or not a file has been reviewed may be assigned to the user. In certain instances, this value may be generated at runtime by the virtual data room through the compilation of various variables (e.g., number of page views, or percentage of pages viewed, etc). Thus, for example, business logic in the virtual data room may provide a dynamic determination as to whether or not a file has been "reviewed" based on the overall interaction of users with the document.

In any event, once the files and associated folders are setup a user that is performing due diligence may request a document and the requested document (or documents) may be retrieved at step 806. This request may be provided to remote terminals such as network computers that process the document on a remote server, may be provided to a user's personal computer, or may be provided to a mobile device (e.g., a smart phone or tablet computer). In certain example embodiments, the type of device used for due diligence review may be recorded (e.g., review of a document on a personal computer may count for "more" than review on a smart phone).

Once the document is retrieved and presented to the requesting user, the user's interactions with the document are tracked in step 808. As discussed herein, such interactions may track the pages viewed, the amount of time spent viewing each page, the total time reviewing a document, etc. All (or some) of this information may be relayed to the virtual data room system to be recorded to a storage medium (e.g., a database system).

In certain example embodiments, review of the document provided from the virtual data room system may be done through a secure document viewer that provides such tracking functionality. Such a secure document viewer may be described in application "DUE DILIGENCE SYSTEMS AND METHODS", the entire contents of which are hereby incorporated by reference.

In step 810, based on user interactions, status indicators related to the document being reviewed may be updated. For example, if the user completely reviews the document, the virtual data room may set the status of the document to "reviewed."

In step 812, after having the status of a document updated, a request may be received to view the due diligence progress. In accordance with this request, in step 814, a visual characteristic may be determined for one or more folders based on the contents of those folders. As discussed above, in certain example embodiments, this may involve dynamically determining a due diligence status of a folder by interrogating various attributes associated with the document in the respective folders. In certain example embodiments, this determination may involve retrieving a status value for each of the documents in the folder and then determining a folder visual request based on those retrieved values.

In certain instances, the determination of a due diligence status may be based on some, but not all, of the files associated with a given folder. Some filed may be ignored or skipped when the determination is being made. For example, if the user or group does not have access to a particular file it may not be counted in the status determination. In another example, the status determination may be based on a type of file. For example, text documents may be considered while images or other media may be ignored when the due diligence status value is determined.

In any event, when the visual characteristic of the respective folder is determined, a visual representation of the due diligence progress may be created and displayed to the requesting user in step 816. As described above, the visual representation may take the form of different icons. In certain example embodiments, the folder view may be combined with a heat map to indicate what areas (e.g., folders) are "cool" (e.g., not seeing much activity) versus folders that are complete or "hot" (e.g., seeing a lot of review activity). Thus, different colors may be used to represent the various due diligence statuses of a given folder.

FIG. 9 is a block diagram of an exemplary computing system according to certain example embodiments. A processing system 900 may include a central processing unit or CPU 902, a system bus 906 that communicates with RAM 904 and storage 908. The storage 908 can be magnetic, flash based, solid state, or other storage technology. The system bus 906 may also communicate with a user input adapter 910 (e.g., a PS/2 or USB interface) that allows users in input commands to the processing system via a user input device 912 (e.g., a keyboard, mouse, touch panel, or the like). The results of the processing may be displayed to a user on a display 916 via a display interface 914 (e.g., a video card or the like).

The processing system 900 may also include a network interface 918 that may facilitate wired (e.g., Ethernet) or wireless communication (WiFi/802.11x protocols, cellular technology, and the like) with external systems 922 or databases 920. External systems 922 may include other processing systems, systems that provide third party services, etc. Here, external systems may also be the client or server system. For example, the processing system 900 may implement functionality of a client system (e.g., where users review documents and a secure viewer is running) as described herein, thus the external system may be the server system (e.g., a VDR system) as described herein. Conversely, the processing system 900 may implement the server system and the external systems may include client systems. External systems may also include network attached storage (NAS) to hold large amounts of data (e.g., thousands or millions of electronic documents). Such external systems for storage along with the internal storage and memory may form a storage system for storing and maintaining information (e.g., documents) that are the subject of a due diligence process. Such a system many communicate with user and respective computing resource (e.g., a client system, terminal, etc) to provide documents and information for review and consideration. The database 920 may include relational, object orientated, or other types of databases for storing information.

In other words, the processes, techniques, and the like, described herein may be implemented on a computing system. Such implementations may then configure or program the processing system to carry out aspects according to certain example embodiments.

Certain example embodiments herein are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, the example embodiments herein can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), and an erasable programmable read-only memory (EPROM or Flash memory).

Thus, the invention may be embodied in many different forms, not all of which are described above.

It is emphasized that the terms "comprises" and "comprising", when used in this application, specify the presence of stated features, integers, steps, or components and do not preclude the presence or addition of one or more other features, integers, steps, components, or groups thereof.

It will be appreciated that aspects of the embodiments described herein may comprise yet further embodiments. Also, the embodiments herein (or aspects thereof) may be combined in various ways to form additional embodiments.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke 35 U.S.C § 112, $6^{th}$ paragraph unless the words "means for" or "step for" are used. Furthermore, no embodiment, feature, component, or step in this specification is intended to be dedicated to the public regardless of whether the embodiment, feature, component, or step is recited in the claims.

The particular embodiments described above are merely illustrative and should not be considered restrictive in any way. The scope of the invention is determined by the claims, and all variations and equivalents that fall within the range of the claims are intended to be embraced therein.

The invention claimed is:

1. A system for providing a virtual data room for conducting due diligence on a plurality of documents by a plurality of users that communicate with the system via a network, the system comprising:
   a storage medium configured to:
      store the plurality of documents on which due diligence is to be conducted by the plurality of users; and
      store at least one due diligence status value for each one of the plurality of documents; and
   a processing system that includes at least one processor, the processing system configured to:
      associate each one of the plurality of documents, indirectly or directly, with at least one folder out of a plurality of folders, a first set of documents of the plurality of documents being contained within a first folder included in the plurality of folders;
      provide a requested document included in the first set of documents to a user in the plurality of users;
      update the at least one due diligence status value that is associated with the document based on usage of the document by the user;
      receive a display request to view a visual representation of the first folder from a perspective of the user;
      automatically determine a displayable characteristic of the first folder based on the at least one due diligence status value associated with each one of the documents in the first set of documents that are contained within the first folder;
      responsive to the display request, output data for forming a graphical user interface that includes a heat map that overlays a tree view of the plurality of folders, the heat map including a visual representation of the first folder, the visual representation of the first folder being based on the automatically determined displayable characteristic of the first folder that sets how the first folder will be visually represented in the graphical user interface to the user, the graphical user interface to be presented on a display device to the user, wherein different visual representations of the first folder are formed based on different determinations of the displayable characteristic of the first folder; and
      based on changes to the due diligence status values that are associated with documents in the plurality of folders, dynamically update the heat map that overlays the tree view to visually represent how the due diligence status values of the documents have changed.

2. The system of claim 1, wherein the at least one due diligence status value includes a reviewed status value that indicates whether the respective document has been reviewed or not reviewed by at least one user in from the plurality of users.

3. The system of claim 2, wherein:
   the visual representation of the first folder is a first visual representation when all of associated documents of the first set of documents have a reviewed status value of not reviewed,
   the visual representation of the first folder is a second visual representation when a partial subset of the first set of documents have a reviewed status value of reviewed, and
   the visual representation of the first folder is a third visual representation when all of the first set of documents has a reviewed status value of reviewed.

4. The system of claim 2, wherein the reviewed status value of the document is updated to indicate that the document has been reviewed when the user has the document open for more than a predetermined period of time.

5. The system of claim 1, wherein the at least one due diligence status value includes an assignment due diligence task value that indicates whether the respective document is associated with a due diligence task that is assigned to at least one user of the plurality of users.

6. The system of claim 1, wherein the processing system is further configured to manage permissions on each one of a plurality of items such that each one of the plurality of users is associated with at least one of the plurality of items, wherein the plurality of items includes the plurality of documents and/or the plurality of folders, and
   the managed permissions include a record that the user in the plurality of users has access to the first set of the documents.

7. The system of claim 1, wherein the processing system is further configured to:
   receive a second display request to view a second visual representation associated with a group of folders in the plurality of folders from a perspective of a group of users in the plurality of users;
   determine a respective displayable characteristic of each one of the folders in the group of folders based on the at least one due diligence status value associated with each one of the documents associated, directly or indirectly, with the respective folder; and
   responsive to the second display request, output data for forming the second visual representation associated with the group of folders, the second visual representation of each icon based on the respective displayable characteristics of each one of the folders in the group of folders.

8. The system of claim 1, wherein the first folder is associated with other documents out of the plurality of documents that are not within the first set of documents.

9. A method of providing information to a group of users conducting due diligence through a virtual data room system, the virtual data room system including at least one processor, the method comprising:
   storing a plurality of files on a storage medium system that is associated with the virtual data room system;
   managing a plurality of folders, each one of the plurality of managed folders associated, directly or indirectly, with at least one of the plurality of stored files, the plurality of folders including a first folder that contains a first group of stored files out of the plurality of stored files;
   storing, on the storage medium system, at least one due diligence status value for each one of the plurality of stored files;
   tracking user interaction with a stored file in the first group of stored files;
   updating the at least one due diligence status value that is associated with the stored file based on the tracked user interaction with the stored file;
   receiving a request for viewing, as part of a graphical user interface, at least the first folder out of the plurality of folders;
   responsive to the received request for viewing at least the first folder out of the plurality of folders, dynamically calculating, via the at least one processor, a display characteristic for the first folder based on each one of the due diligence status values associated with the first group of stored files in the first folder;

outputting data, as part of the graphical user interface (GUI), that represents a heat map that overlays a tree view of the plurality of folders that are represented in the GUI, wherein a visual indication of the first folder is displayed on a display device to a user as part of the GUI, the visual indication based on the calculated display characteristic; and based on changes to the due diligence status values that are associated with documents in the plurality of folders, dynamically updating the heat map that overlays the tree view of the plurality of folders that are represented in the GUI to visually represent how the due diligence status values of the documents have changed.

10. The method of claim 9, wherein the at least one due diligence status value includes a reviewed status value that indicates whether the stored file has been reviewed.

11. The method of claim 10, wherein:
the visual indication is a first visual indication when all of the files in the first group of stored files have a reviewed status value of not reviewed,
the visual indication is a second visual indication when a partial subset of the first group of stored files have a reviewed status value of reviewed, and
the visual indication is a third visual indication when all of the first group of stored files has a reviewed status value of reviewed.

12. The method of claim 9, wherein the at least one due diligence status value includes an assignment task value that indicates whether the stored file has an outstanding task assigned to at least one user of the group of users.

13. The method of claim 9, further comprising:
assigning permissions to each one of the plurality of stored files, each one of the assigned permissions associated with at least one user of the group of users and/or the group of users of the virtual data room system.

14. The method of claim 13, wherein calculation of the display characteristic that is associated with the first folder is based on files for which the user has access based on the assigned permissions.

15. The method of claim 13, wherein calculation of the display characteristic that is associated with the first folder is based on files for which a group of users have access based on the assigned permissions.

16. A non-transitory computer readable storage medium storing instructions for use with a virtual data room system for performing due diligence on securely stored information that is remotely accessible to a plurality of users, the securely stored information including a plurality of different documents, each of which is respectively associated with at least one due diligence status value, the stored instructions comprising instructions configured to:
associate each one of the plurality of different documents of the stored information with at least one virtual folder out of a plurality of virtual folders, a first document of the stored information being contained within a first virtual folder out of the plurality of virtual folders;

receive a request from a remote computing device to retrieve the first document of the stored information;

send the first document of the stored information to the remote computing terminal responsive to the received request;

update the at least one status value of the first document based on a determined interaction with the first document;

receive a display request to view a visual representation, as part of a graphical user interface, of at least the first virtual folder;

determine a display characteristic of the first virtual folder based on the at least one status value associated with each one of the plurality of different documents that are contained with the first virtual folder;

responsive to the display request, automatically forming, as part of the graphical user interface (GUI), a heat map that overlays a tree view of the plurality of folders that are represented in the GUI, wherein the visual representation of at least the first virtual folder based on which one of plural display characteristics was determined for the first virtual folder; and based on changes to the due diligence status values that are associated with documents in the plurality of folders, automatically update the heat map that overlays the tree view to visually represent how the due diligence status values of the documents in the plurality of folders have changed.

17. The medium of claim 16, wherein the first document of the stored information that is sent to the remote computing terminal is encrypted.

18. The medium of claim 16, wherein the at least one status value includes a reviewed status value that indicates whether the respective document of stored information has been reviewed or not reviewed.

19. The medium of claim 18, wherein:
the visual representation of at least the first virtual folder is a first visual representation when all associated documents of stored information have a reviewed status value of not reviewed,
the visual representation of at least the first virtual folder is a second visual representation when a partial subset of the associated documents of stored information have a reviewed status value of reviewed, and
the visual representation of at least the first virtual folder is a third visual representation when all of the associated documents of stored information have a reviewed status value of reviewed.

20. The medium of claim 16, wherein the display request includes an indication of a particular user of a group of users and the visual representation is based on the indication.

* * * * *